Feb. 19, 1952     W. G. HOELSCHER     2,586,654
TRACER CONTROL VALVE
Filed June 3, 1948

INVENTOR.
William G. Hoelscher
BY
Wood, Arey, Herron & Evans
ATTORNEYS

Patented Feb. 19, 1952

2,586,654

UNITED STATES PATENT OFFICE 2,586,654

TRACER CONTROL VALVE

William G. Hoelscher, Cincinnati, Ohio, assignor to The American Tool Works Company, Cincinnati, Ohio, a corporation of Ohio Application June 3, 1948, Serial No. 30,906

3 Claims. (Cl. 251—132)

This invention relates to control valves for hydraulically controlled machine tools of the type employing a stylus and template to reproduce the profile of the template in the work. The present improvements reside specifically in an improved hydraulic tracer valve which is controlled by the stylus and which in turn causes movements of the cutting tool in accordance with the profile traced by the stylus.

Tracer valves of this type permit the machine tool automatically to duplicate work pieces with exceptional accuracy at production speed rates. The tracer valve stylus bears against the template and the valve controls a hydraulic circuit which in turn moves the cutting tool in accordance with the template profile. One example of this operation is in conjunction with a lathe adapted to produce duplicate parts such as stepped shafts at a production scale of operation.

As applied to a lathe, the tracer valve is mounted upon the tool slide and a template is mounted adjacent the tracer valve so that the stylus lightly contacts the surface of the template to trace the template profile. The tool slide is mechanically connected to a hydraulic cylinder assembly and the cylinder assembly and tracer valve are connected in the hydraulic circuit so that movements of the stylus cause corresponding actuation of the cylinder assembly and tool slide. Thus, the cutting tip of the tool follows precisely the longitudinal and transverse movements of the stylus as it traces the template profile.

In general, the tracer valve constitutes a valve body having a cylindrical bore provided with a slidable plunger. It is connected in the hydraulic circuit between the hydraulic supply unit and the tool slide cylinder assembly as a reversing valve. The slidable plunger is spring-urged against the lower end of a stylus spindle which is free to shift angularly under the influence of the stylus. When the stylus is bearing against the template the plunger is held at a neutral position. When the stylus shifts in either direction the plunger moves from neutral in a direction appropriate to move the tool slide, tool and tracer valve toward or from the template until the neutral condition is reestablished. Thus, the valve and cutting tool accurately follow and trace the contour of the template.

It has been found that in order to achieve the highest order of precision and production speed, the valve must be instantly responsive to very minute changes in template profile. By decreasing resistance to stylus movement, the responsiveness of the apparatus is increased and consequently the accuracy of the work is improved. This is reflected particularly as applied to work which must be held to relatively close limits and work having particularly slight profile irregularities.

Briefly, it is the concept of the invention to provide a tracer valve having a valve stem and stylus arranged for angular movement with a valve plunger related to the stem in a manner to move longitudinally under such angular stem movements, the plunger being spring-loaded against a ball bearing to prevent lost motion and at the same time to permit it to float rotationally for minimum resistance and maximum responsiveness.

A primary object of the invention has been to provide a tracer valve in which resistance to a movement is minimized so as to provide a valve which more accurately follows the profile of the template.

A further object has been to provide a tracer valve in which the plunger is arranged to float substantially without friction relative to the stationary body of the valve whereby the movement of the stylus is more accurately transmitted to the plunger so that the tool slide is caused more accurately to follow the movements of the tip of the stylus.

Still another object has been to provide a valve plunger which is spring-loaded between a ball and a ball bearing to permit rotational floating without lost motion whereby wearing of the plunger is minimized and the life and accuracy of the valve is increased.

Further objects and advantages of the invention will be more clearly disclosed with reference to the accompanying drawing in which.

Figures 1, 2:
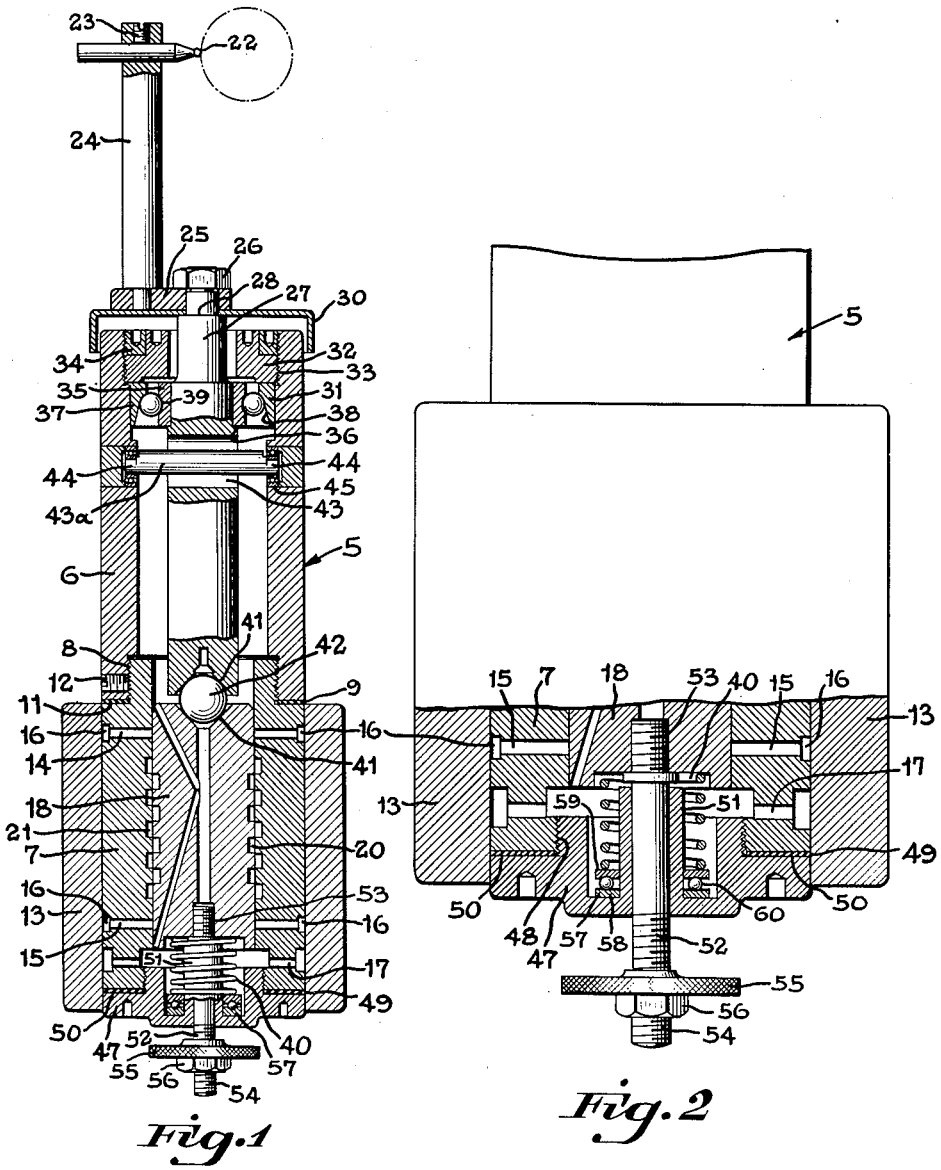
Figure 1 is a general sectional view illustrating a tracer valve incorporating the improved floating plunger.
Figure 2 is an enlarged fragmentary view further detailing the anti-friction bearing arrangement in the base of the tracer valve.

Referring to Figure 1 illustrating the valve structure generally, a cylindrical casing is indicated at 5. This casing preferably constitutes an upper barrel 6 and a sleeve 7 secured at the lower end of the casing by a screwthreaded counterturned portion 8. The lower end of barrel 6 is internally screwthreaded and a sealing gasket 9 is compressed between the shoulder 11 of the portion 8 and the lower end of barrel 6 to provide a fluid tight seal. A set screw 12 is provided to lock the two parts in assembly.

The valve assembly is mounted upon a tool slide of the machine tool by means of a clamping bracket (not shown) which preferably embraces and clamps the casing 6 thereon.

Surrounding the lower sleeve 7 is a manifold sleeve 13 provided with respective pairs of intake and discharge ports (not shown) which connect respectively the hydraulic supply unit and the cylinder assembly of the cutting tool. The flow of fluid through these ports is controlled by the valve so that supply and return of hydraulic fluid in the appropriate direction occurs when the stylus is actuated. In other words the valve operates as a reversing valve causing fluid to be supplied to either end of the cylinder assembly depending upon the position of the plunger. The sleeve 7 includes intake ports 14 and discharge ports 15 which are in communication with annular grooves 16 formed in the outside diameter of the sleeve. These respective grooves communicate with the inlet and discharge passageways previously noted. The lower end of sleeve 7 further is provided with ports 17 which communicate with ports in the manifold sleeve 13 to withdraw any fluid which may leak past the valve plunger. Ports 17 are under constant vacuum by means of a vacuum line which communicates with the delivery unit so as to return the fluid back to the unit for recirculation. A detailed disclosure of the fluid circuit is omitted because it is not essential to an understanding of the present invention.

The tracer valve includes a plunger 18 slidably disposed in the bore of sleeve 7. The plunger is provided with a series of annular passageways 20 and the inside diameter of sleeve 7 is provided with a series of annular passageways 21. As shown, the valve is in a neutral or closed position so that there is no communication between the passageways 20 and 21. The respective intake and discharge ports 14 and 15 are appropriately connected to alternate grooves 20 in such manner that when the plunger 18 moves from neutral, hydraulic fluid is supplied under pressure to one of the discharge ports 15 to one side of the hydraulic cylinder assembly and when the plunger is moved in the opposite direction fluid is supplied to the opposite side of the hydraulic cylinder assembly. Thus, the cutting tool is moved toward or away from the work depending upon the movements of the valve plunger.

By virtue of the multiple annular grooves 20 and 21, a very slight movement of the valve plunger 18 produces a relatively large discharge of fluid by virtue of the cumulative effect of the grooves. The function of the valve, therefore, primarily is that of a reversing valve so that in a neutral position, as shown, the fluid is blocked and when the plunger 18 moves in either direction from neutral, fluid is discharged to an appropriate end of the cylinder assembly to cause the necessary tool slide operation. Since the present invention is directed primarily to the mechanical means for providing greater sensitivity and responsiveness, the details of the valve passageways and the hydraulic system have been omitted.

As illustrated in Figure 1, the tracer valve includes a stylus 22 secured by means of a set screw 23 to the upper end of a stem 24. To the lower end of stem 24 is secured a lateral arm 25 which is fixed by means of a nut 26 to the upper end of the valve spindle 27. The spindle 27 includes a shoulder 28 and a cap 30 is clamped against the shoulder by means of nut 26 and arm 25.

The stem and spindle unit is arranged to rock angularly relative to the valve body as the stylus 22 traces the profile of the template. For this purpose a modified ball bearing assembly 31 is located at the upper end of the barrel 6. Bearing 31 is maintained in position by means of closure cap 32 screwthreaded as at 33 into the upper end of barrel 6. A lock ring 34 is provided to maintain the closure ring 33 in adjusted position. The modified ball bearing 31 includes an inner race 35 seated against a shoulder 36 of stem 27. The lower portion of the inside diameter of outer race 37 is flared as at 38 and the balls are retained by the groove 39 formed in the inner race. This permits the stem to rock angularly under the influence of the stylus. It will be apparent therefore, that the stem 27 is free to rock universally at the center line of the bearing 31.

The valve plunger 18 is urged upwardly against the lower end of stem 27 by means of a coil spring 40. The adjacent upper and lower ends of the valve plunger and stem include respective cone-shaped recesses 41—41. A ball 32 is seated in the respective recesses so that the angular movements of the stem are transmitted through the ball to the valve plunger to convert the angular movements of the stem into vertical valve actuating movements. It will be apparent therefore that any movement of the stylus 22 will cause tool actuating movements of the valve plunger.

The valve spindle 27 is provided with a slot 43 through which passes a cross pin 43a having substantially the same diameter as the width of the slot. The cross pin extends diametrically across the bore of core 6 and includes offset ends 44—44 journalled in ball bearings 45. The intermediate portion of the pin constitutes, in effect therefore, a crank throw permitting angular movement of the stem 27 at right angles to the axis of the pin. In other words although the body of the cross pin 43a is closely embraced in the slot 43, the pin, being eccentric with respect to its ends, will permit angular shifting of the spindle 27 to the extent permitted by the eccentricity of the cross pin. Angular displacement of the stem longitudinally of the pin is permitted since the slotted portion of stem is free to slide relative to the cross pin. It will be apparent therefore that the valve stem 27 is free to shift to a limited extent universally, but that rotation is prevented by virtue of the cross pin 43a. This arrangement operates with a minimum of resistance so as to block the stem securely against rotation without resisting angular movements of the stem which would effect the sensitivity of the valve.

It will be observed that the valve plunger 18 should be free to float rotationally relative to the sleeve 7 for maximum sensitivity and efficient performance. As previously noted, the coil spring 40 urges the valve plunger 18 upwardly against spindle 27 so that lost motion is eliminated.

It will be noted that the lower end of sleeve 7 includes a closure cap 47 to take the thrust of spring 40. This cap is screwthreaded as at 48 into the lower end of sleeve 7. A sealing gasket 49 is compressed between a flange 50 of the closure cap and the lower end of sleeve 7. As shown in Figure 2, closure cap 47 includes an upwardly extending sleeve portion 51 which provides a slide bearing for a stem 52, the upward end of which is screwthreaded into the valve plunger 18 as at 53. The lower end of stem 52 is screwthreaded as at 54 and upon this screwthreaded portion is engaged an adjustable disk 55 locked in position by a lock nut 56. The stem 52 and disk 55 are arranged to be engaged by a suitably designed fork member (not shown) which in turn is connected to a manual operating lever. Movement of the operating lever is transmitted to the fork by suitable linkage so that the valve plunger may be controlled manually if desired.

It has been the practice to seat the lower end of spring 40 directly upon the closure cap 47. It will be apparent that this will offer a resistance to the rotational floating of the valve plunger 18 since the frictional resistance of the spring is transmitted from the stationary closure plate through the spring to the movable valve plunger 18. Thus, the frictional engagement of the lower end of the spring upon the stationary closure cap prevents the valve stem from floating relative to the sleeve 7. In order to eliminate this condition, a thrust bearing 57 is inserted between the lower end of spring 40 and the closure plate 47. Ball bearing 57 preferably is of a commercially available type constituting a lower race 58 and an upper race 59 with bearing balls 60 disposed therebetween. It will be apparent therefore that the thrust of the spring 40 is transmitted from the upper race 59 through the balls 60 to the stationary lower race with substantially no resistance to turning. This arrangement therefore permits the valve plunger and spring to rotate as a unit relative to the closure cap so that the plunger is free to float relative to the sleeve 7. It will be apparent that the plunger is at all times maintained under compression between ball 42 and ball bearing 57 so that lost motion is eliminated while at the same time the plunger 18 is free floating.

During operation the valve spindle 27 shifts angularly in various directions as determined by the profile of the template. These movements are transmitted through the ball 42 to the valve plunger 18 and by virtue of the various swinging movements of the spindle there will be a tendency for the plunger to rotate relative to the sleeve 7 by reason of the rolling movement of the ball 42 as imparted by spindle 27. In the absence of the ball bearing 57 between spring 40 and the stationary cap 47, this tendency to rotate would be resisted by the friction of the lower end of spring 40 against the cap. It has been determined that although relatively slight, this resistance adversely effects the response and accuracy of the valve. It has been found by virtue of the antifriction bearing 57, that a superior grade of work can be produced due to the more perfect duplication between template and work. Also by reason of the free floating plunger wear between plunger and sleeve is greatly reduced with the result that the life of the valve at maximum efficiency of performance is prolonged.

Having described my invention, I claim:

1. A hydraulic tracer valve comprising; a valve casing, a spindle journalled in said casing and arranged for angular movement relative to the casing, means for locking the spindle against rotary movement a slidable valve plunger in said valve casing, means including a ball between the adjacent ends of said spindle and valve plunger to convert angular movements of the spindle into longitudinal plunger movements, a compression spring engaged against an end of said valve plunger to urge said valve plunger against the end of said spindle, and a ball bearing forming a seat for said compression spring.

2. A hydraulic tracer valve comprising; a valve casing, a spindle journalled in said casing and arranged for universal angular movement relative to the casing, means for locking the spindle against rotary movement a stylus mounted upon the outer end of said spindle, a slidable valve plunger rotatably mounted in said valve casing, means including a thrust ball between the adjacent ends of said spindle and valve plunger to convert angular movements of the spindle into longitudinal plunger movements, a closure cap on said valve casing, a compression spring between the end of said valve plunger and said closure cap, said spring adapted to urge said valve plunger against the end of said spindle, and a ball bearing between the said spring and said closure cap whereby the valve plunger is maintained under spring compression between said thrust ball and said ball bearing and is adapted to be rotated in response to angular movement of the spindle.

3. A hydraulic tracer valve comprising; a valve casing, a spindle non-rotatably journalled in said casing and arranged for angular movement relative to the casing, a slidable valve plunger rotatably mounted in said valve casing, means including a ball between the adjacent ends of said spindle and valve plunger to convert angular movements of the spindle into longitudinal plunger movements, a coil spring seated against an end of said valve plunger to urge said valve plunger against the end of said spindle, and a ball bearing seated in the casing and forming a seat for said coil spring.

WILLIAM G. HOELSCHER.

REFERENCES CITED

The following references are of record in the file of this patent:

UNITED STATES PATENTS

| Number | Name | Date |
|---|---|---|
| 1,458,355 | Nelson | June 12, 1923 |
| 2,263,110 | Turchan | Nov. 18, 1941 |
| 2,364,873 | Rosen | Dec. 12, 1944 |